Oct. 21, 1952 — P. E. VAN HORN — 2,614,861
TRAILER HITCH

Filed Aug. 1, 1949 — 2 SHEETS—SHEET 1

INVENTOR
PERRY E. VAN HORN
BY
ATTORNEY

INVENTOR
PERRY E. VAN HORN
ATTORNEY

Patented Oct. 21, 1952

2,614,861

UNITED STATES PATENT OFFICE 2,614,861

TRAILER HITCH

Perry E. Van Horn, Grand Rapids, Mich.

Application August 1, 1949, Serial No. 107,921

2 Claims. (Cl. 280—33.15)

The present invention provides a simple and easily attached trailer hitch having particularly valuable operational characteristics. The increased use of house and baggage trailers in conjunction with automobiles has established a definite need for coupling devices through which these trailers may be securely and quickly attached with a minimum of effort, while retaining the highest obtainable degree of safety. It is the conventional practice to provide a device with two general coupling members, one of which is attached to the automobile and the other to the trailer. When it is desired to use the trailer, these two coupling elements are brought into conjunction, and a suitable pivotal connection is affected. This connection permits considerable articulation between the trailer and the automobile in the horizontal plane in order to make possible the turning of corners and also to compensate for any small misalignment which may occur. The coupling element attached to the automobile is usually associated either with the bumper or with some fixed portion of the frame where it may be securely welded or bolted in position. Where the bumper is used as the attaching point, a clamp system is the usual means utilized for securing the coupling element. The advantage of attaching this member to the bumper of the automobile is simply that this point of connection is readily available, and gives a certain springiness of attachment which may be valuable in some instances.

Experience has taught that the use of these coupling devices must be attended with enough safety equipment so that the failure of any particular portion of the hinge mechanism will not result in the trailer going astray on the highway at high speed and thus endangering the lives and property of the public. The most frequent source of trouble in these devices is, of course the hinge pin through which the coupling loads are transmitted. The continuous change in direction of load, and the articulation of the joint as the vehicle turns corners result in subjecting the pivot connection to severe wear. The fact that the connection is not permanent results in considerable difficulty in assuring that the joint be properly lubricated. Dust and grit from the highway also contribute to the problems involved.

These circumstances have resulted in requiring that the trailer be coupled to the vehicle by some auxiliary means other than the principal pivot connection. The use of connecting chains is well known, and it is the general practice to connect these chains with a considerable amount of slack with the coupling elements in the normal position. If the hinge pin were to let go, the chains confine the trailer and prevent the same from endangering other cars on the highway. It will be obvious, however, that the use of chains gives a very unstable connection between the vehicle and the trailer; and that there is likely to be a dangerous amount of thrashing and misalignment as soon as the hinge pin lets go. This is particularly true in the case of the two wheeled trailer which has a more definite requirement that the tongue be securely positioned. The four wheeled trailer is not much better, since any play in the attachment of the tongue to the vehicle results in an oscillating type of instability that is certain to make the vehicle and trailer very difficult to control.

Another trouble frequently encountered in the use of trailers results from instability during the application of the brakes of the towing vehicle. This is particularly aggravated when brakes are not at the same time applied to the trailer. It will be recognized that as long as the force supplied by the inertia of a heavily loaded trailer passes directly through the center of resistance of the automobile upon the road, that no rotation of the automobile will take place. Since the hinge connection is considerably to the rear of this center of movement, the system is highly unstable. As soon as a slight displacement of the direction of force applied by the trailer occurs with respect to the center of resistance of the vehicle upon the pavement, a twisting moment is applied tending to rotate the vehicle about its center of frictional resistance. This arrangement generates the well known "jackknifing" action in which the trailer and the towing vehicle tend to rotate with respect to each other until the side of one engages the side of the other. It is not necessary to elaborate upon this action in order to make clear the dangers involved when such a situation occurs upon the highway under icing conditions, or in any situation in which the weight of the trailer is sufficient to overcome the directional stability of the vehicle with its brakes applied.

The present invention provides a trailer hitch having an auxiliary coupling system arranged to act after the principal hinge pin has failed. This system replaces the chains in conventional use for this purpose, and has the advantage of providing a much more suitable connection between the trailer and the vehicle than is possible with any type of flexible member functioning similarly to the chain. The construction provided by the present invention permits the use of a series of fastenings holding the various components in assembled relationship which are so positioned that dependence upon any particular one of them is minimized. Any mechanic is familiar with the fact that a bolt may be over-loaded almost to the point of failure without this condition being made visible to the eye. Repeated over-stressings may leave any particular bolt in such condition that it is entirely inadequate to transmit its normal load. With the arrangement provided by the present invention, the presence of a series of fastenings rather than any single one to perform a given purpose is a considerable safety feature in and of itself. In addition, the principal hinge pin is loaded in a manner referred to as "double shear," in which one connecting member is received between a pair of members associated with the other coupling component. This arrangement is opposite to the system in which a hinge pin is supported as a cantilever member on one side of the connection. The stresses generated in the "double shear" connection are considerably less than with the other arrangement, and the device is much more able to resist extraordinary shock loadings than is otherwise the case.

The auxiliary coupling provided by the present invention comprises, in its simplest and consequently the preferred form, a plate mounted upon one of the coupling components and extending beyond the principal hinge point to cooperate with a fixed point upon the other component. Preferably the cooperation between this auxiliary coupling and the aforementioned fixed point is through the engagement of a bolt with an arcuate slot. It will be obvious that with the plate anchored to one of the coupling components and engaging the other through an arcuate slot that articulation may take place while still permitting the auxiliary coupling to prevent disengagement of the trailer from the vehicle on failure of the principal hinge pin. In order to secure the desired amount of angular articulation between the coupling member while retaining a minimum size for the auxiliary plate, it is preferred to connect the plate to both coupling members through the use of arcuate slots and cooperating bolts. The total amount of articulation is therefore provided by the action of the two sets of slots. Under normal conditions, the arcuate slots will not transmit load to their cooperating bolts. On failure of the principal hinge pin, however, enough shifting of position of the various parts will take place to bring these members into engagement and load will be transmitted as indicated with the plate acting as a link. It is possible, incidentally, to provide for the engagement of the auxiliary coupling means quickly enough to bring these components into play before the principal hinge pin has completely sheared off. It is well known that a bolt may be considerably displaced from its normal shape while still retaining its structural integrity; and if the auxiliary coupling means can prevent complete destruction of the bolt, the operating characteristics of the coupling system can be considerably improved.

The present invention also provides a system of stops for limiting the angular articulation taking place between the towing vehicle and the trailer. The purpose of this feature is to prevent complete "jack-knifing," and it also has the advantage of limiting the amount of angle which the driver of the automobile may generate in a turn. In the preferred form of the present invention, the articulation-limiting feature is combined with the auxiliary coupling system by proportioning the arcuate slots previously described so that the ends of the slots are positioned to act as the required stops. The simplicity of this arrangement is obvious, and it will also be noted that there is the advantage that the fittings utilized for controlling the angular limitation are generally different from those used during the normal transmission of the pulling and stopping loads. In other words, the principal hinge fitting is normally not excessively loaded due to the action of the mechanism limiting the angular movement.

The various features of the present invention will be analyzed in detail by reference to the particular embodiments illustrated in the accompanying drawings. In these drawings, Figure 1 is a perspective view of the preferred form of the present invention, with the coupling component attached to the car and that attached to the trailer in normal cooperating engagement.

Figure 1:
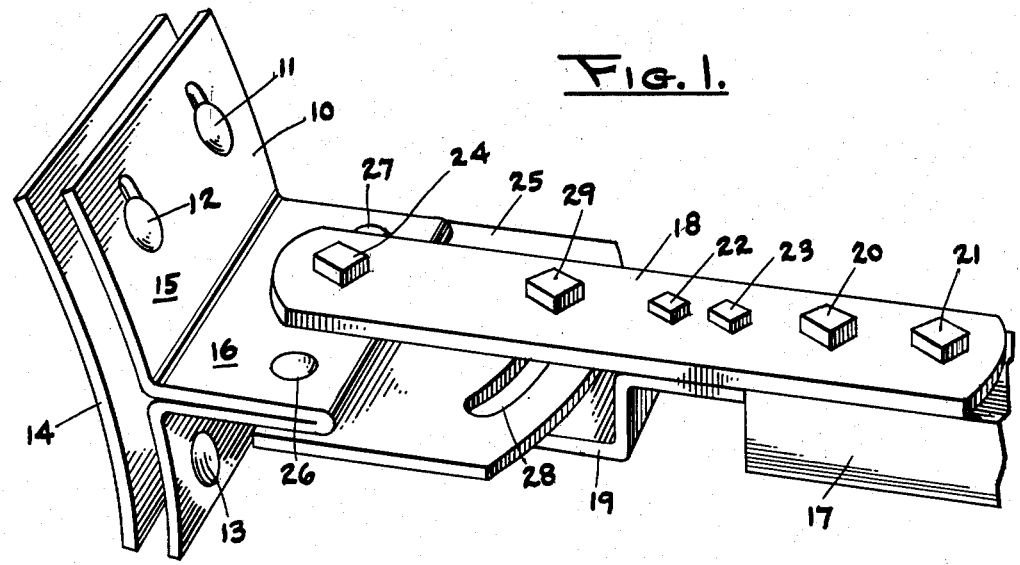

Referring to Figure 1, a clamping unit is generally indicated at 10 adapted to engage the rear bumper of an automobile. The bolts 11, 12, and 13 cooperate to draw the plate 14 toward the opposite plate 15 and securely grip the bumper therebetween. The plate 15 is provided with a horizontal section 16 adapted to provide one of the engaging elements of the coupling system. The "tongue" of the trailer is generally indicated at 17, and the engaging members 18 and 19 are securely attached thereto by the bolts 20 and 21. The member 19 is secured to the member 18 by means of the bolts 22 and 23. The members 18 and 19 acting in conjunction provide a fork in which the horizontal section 16 engages to provide support for the principal hinge pivot 24. The auxiliary coupling plate 25 is secured to the horizontal section 16 by the bolts 26 and 27, and is provided with the arcuate slot 28 which cooperates with the bolt 29 carried by the members 18 and 19. It will be obvious that if the principal hinge member 24 were to fail, the bolt 29 would come into engagement with the arcuate slot 28, and loads would be transferred through the plate 25 to the bolts 26 and 27, and from there to the towing vehicle.

Figure 2:
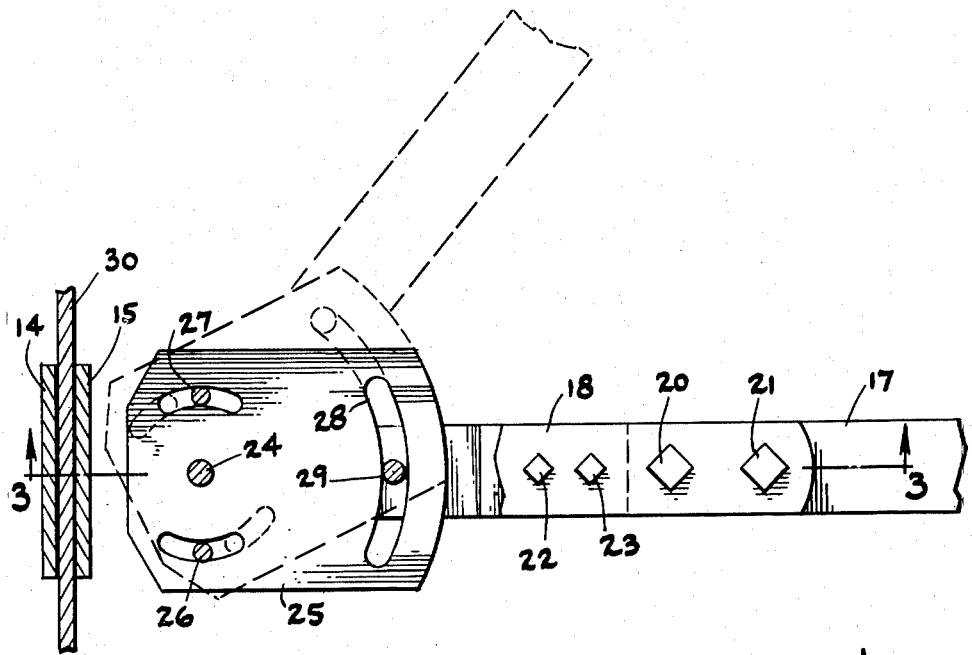
Figure 2 is taken on the plane 2—2 shown in Figure 3, and illustrates the operation of the auxiliary coupling plate shown in perspective in Figure 1.

Referring to Figure 2, a view is shown illustrating the operation of the auxiliary coupling plate 25 when acting as a stop to limit the angular articulation between the tongue 17 and the towing vehicle. It will be noted that the engagement of the plate 25 with the bolts 26 and 27 occurs through arcuate slots, permitting considerable articulation of the plate with respect to the horizontal section 16 of the clamping element. The total amount of articulation which the tongue is permitted is therefore composed of the articulation permitted by the arcuate slot 28 and also by the amount of articulation permitted between the bolts 26 and 27 and their associated arcuate slots. It will be immediately recognized that to obtain the same degree of articulation with the use of a single slot 28 of larger dimensions, the plate 25 would have to be of much greater size and consequently increased cost. The space required by the device would also be considerably greater than that required by the arrangement shown in the drawings.

Figure 3:
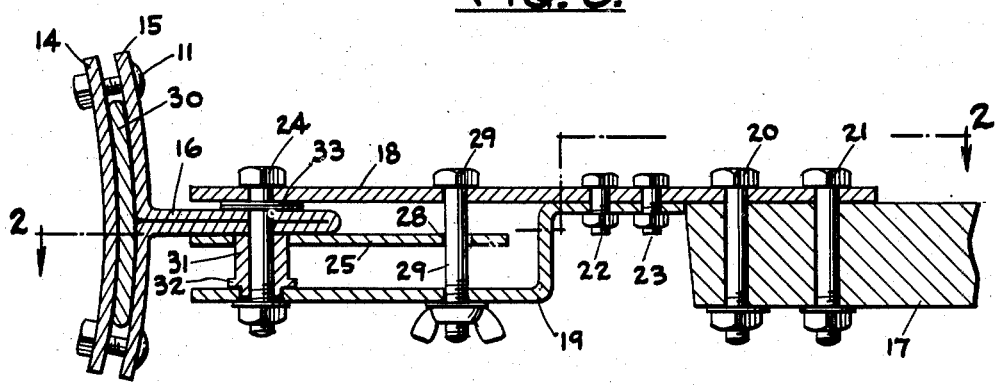
Figure 3 is a section taken on the plane 3—3 of Figure 2 and shows in elevation the various components illustrated in Figure 1.

Referring to Figure 3, the device shown in Figure 1 is illustrated on a section taken on a vertical plane passing through the center of the structure. The position of the bumper 30 of the automobile is clearly shown in engagement between the plates 14 and 15. The hinge bolt 24 passes through a suitable hole in the member 18, and a similar hole in the horizontal section 16. A collar 31 surrounds the lower portion of the bolt, and is provided with the shoulder 32 arranged to position the member 19 with respect to the horizontal section 16. A spacing washer 33 is placed between the member 18 and the horizontal section 16 to prevent the rubbing action following from the articulation of the device. It is of course preferable that the nuts associated with the bolts 24 and 29 be secured in position by a cotter pin or some similar arrangement.

Preferably, the plate 25 is kept assembled with the collar 31, and the collar 31 is permitted to engage the hole in the member 19 associated therewith. Since the auxiliary coupling member 25 is thus retained in engagement with the bolt 29, the attachment of the trailer to the automobile is affected by the removal of the bolt 24 and the adjustment of the two general coupling components until the bolt 24 can be inserted to the position shown in Figure 3. After the insertion of the bolt 24, the bolts 26 and 27 can then be attached to the plate 25, retaining the plate in the position shown in Figure 3.

Figure 4:
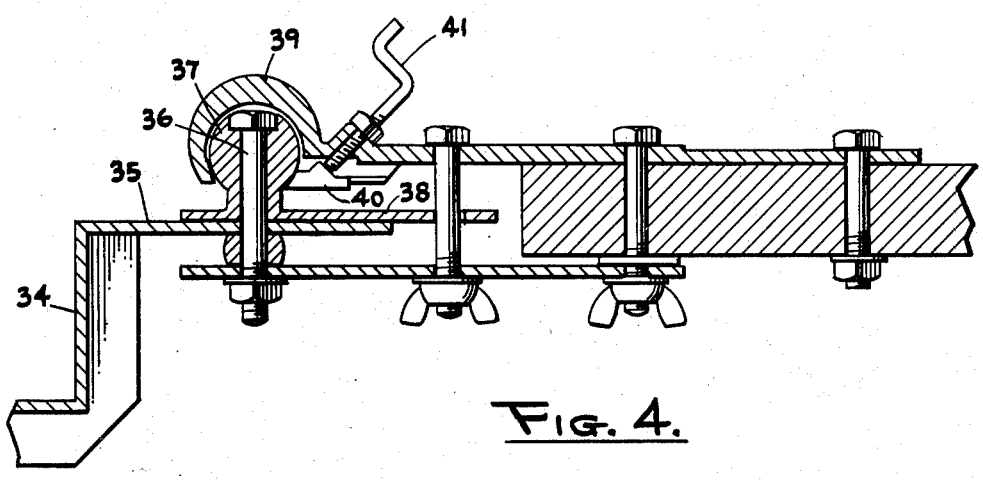
Figure 4 is a section taken through a modified form of the present invention, and showing a device utilizing a ball and socket joint in place of a hinge attachment involved in the mechanism illustrated in Figures 1, 2, and 3.

Referring to Figure 4, a modified form of the present invention is illustrated which makes use of a ball and socket joint in place of the bolt system 24 shown in Figure 3. The attachment of one of the coupling components to the automobile is also affected by a slightly different system. A fixed bracket 34 is rigidly attached to some available portion of the frame of the automobile, and the horizontal plate 35 performs the general function of the horizontal section 16 previously discussed. The bolt 36 engages the spherical member 37, and also passes through the plate 38. Plate 38 performs the same function as the plate 25 discussed in connection with the previous figures. A concave spherical member 39 is rigidly associated with the tongue of the trailer, and is locked in position on the spherical member 37 by means of the moveable lock 40 adapted to slide into engagement with the spherical member 37 under the urging of the crank 41.

In connecting the coupling system shown in Figure 4, it is preferable to remove the lowermost element of the forked connecting component (attached to the trailer). The spherical members can then be brought into engagement, and the fork element then replaced.

The particular embodiments illustrated in the accompanying drawings and described herein are for illustrative purposes only, and are not to be taken as a limitation on the appended claims. In these claims, it is the intent of the inventor to claim the entire invention to which he is entitled in view of the prior art.

I claim:

1. A trailer hitch, comprising: first and second coupling means; means forming a principal hinge joining said first and second coupling means; an auxiliary coupling plate having arcuate slots concentric with the axis of said hinge; and first and second means connecting said plate to said first and second coupling means, respectively, at said slots, said plate being adapted to engage said first and second connecting means at the sides of said slots to transfer load therebetween on shearing of said principal hinge.

2. A trailer hitch, comprising: first and second coupling means; means forming a principal hinge joining said first and second coupling means; an auxiliary coupling plate having arcuate slots concentric with the axis of said hinge; and first and second means connecting said plate to said first and second coupling means, respectively, at said slots, at least one of said connecting means including a bolt supported on said respective coupling means on opposite sides of said plate, said plate being adapted to engage said first and second connecting means at the sides of said slots to transfer load therebetween on shearing of said principal hinge.

PERRY E. VAN HORN.

REFERENCES CITED

The following references are of record in the file of this patent:

UNITED STATES PATENTS

| Number | Name | Date |
| --- | --- | --- |
| 1,389,840 | Neely | Sept. 6, 1921 |
| 2,251,656 | Botelho | Aug. 5, 1941 |

FOREIGN PATENTS

| Number | Country | Date |
| --- | --- | --- |
| 265,159 | Great Britain | July 21, 1927 |